Dec. 25, 1923.  W. J. LILLY  1,478,524

LETTERING APPLIANCE

Filed Dec. 29, 1921

INVENTOR
William Lilly

Patented Dec. 25, 1923.

1,478,524

UNITED STATES PATENT OFFICE.

WILLIAM J. LILLY, OF CHICAGO, ILLINOIS.

LETTERING APPLIANCE.

Application filed December 29, 1921. Serial No. 525,696.

*To all whom it may concern:*

Be it known that I, WILLIAM J. LILLY, a citizen of the United States, residing at 1765 Winnemac Ave., Chicago, in the county of Cook and State of Illinois, have invented new and useful Improvements in Lettering Appliances, of which the following is a specification.

My invention relates to improvements in appliances for rapidly producing accurate, single-stroke alphabetical letters, and is applicable for mechanical and architectural drafting and other purposes.

Reference is made to the accompanying drawing, which forms a part of this specification and in which like letters indicate like parts.

Figure 1:
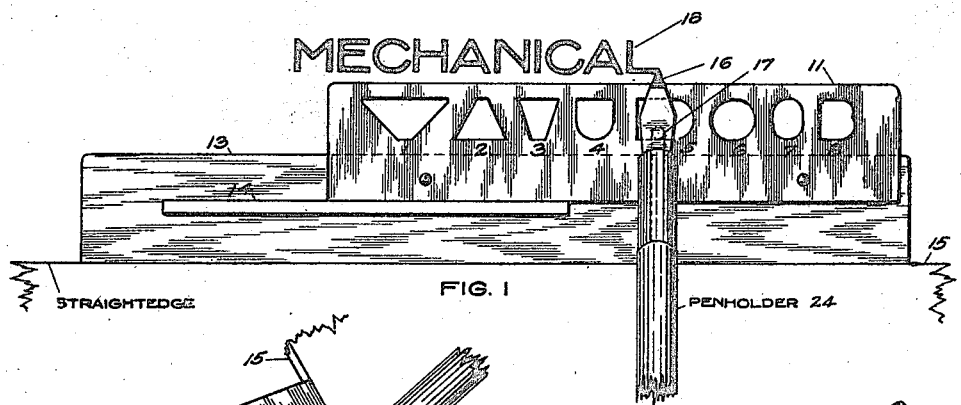
Fig. 1 is a plan view of the lettering appliance, showing the relative position of the various parts for general lettering purposes.
Figure 2:
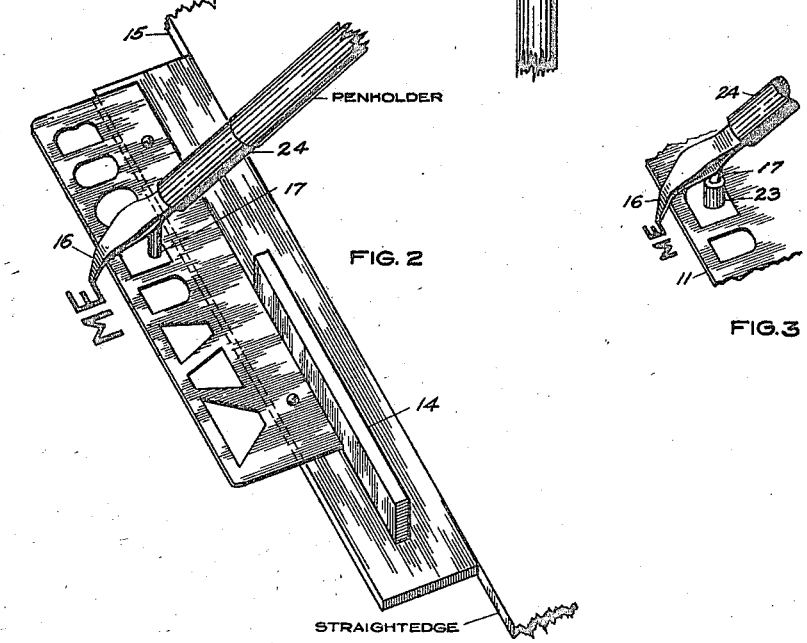
Fig. 2 is a perspective view of the appliance, showing the method of lettering, by means of a pen and penholder, having a projecting member attached thereto, which is used in connection with a plate having perforations, consisting of elements of alphabetical letters, for guiding the pen in the formation of letters.
Figure 3:
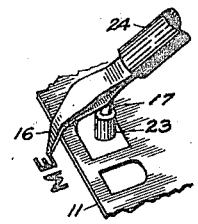
Fig. 3 is a sectional perspective view of the lettering appliance, showing the method of producing letters of various sizes with a single plate having elements of certain dimensions.
Figure 4:
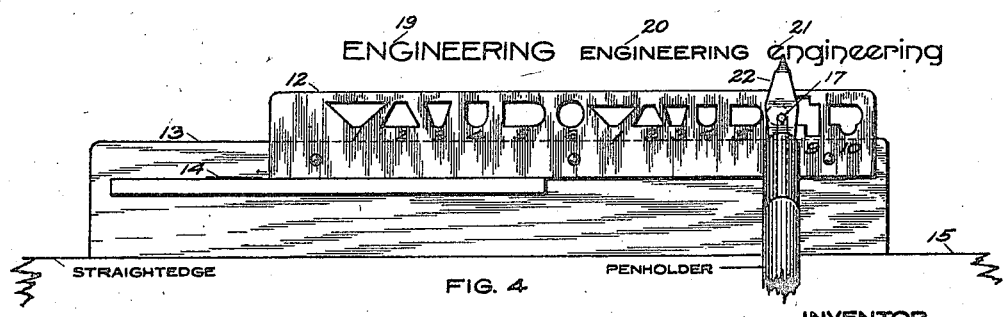
Fig. 4 is a plan view of a combination plate, having two sets of letter elements, of different sizes, with additional elements for producing letters of the lower case.

No. 11 is a plate, having perforations 1—2—3—4—5—6—7 and 8, of various forms, representing the elemetary principles of alphabetical letters. No. 17 is a pin, attached to pen 16 and pen-holder 24, for following the interior of perforations 1 to 10 in the formation of letters. No. 16 is a pen for producing alphabetical letters. 13 is a base, on which plate 11 is mounted. 14 is a handle, for convenience in handling and shifting plates 11 and 12, for forming the various letters.

No. 15 is a straightedge, which is used in connection with the lettering appliance, for producing perfect alignment of letters; 16 and 22 are lettering pens for producing letters of various sizes and styles. Nos. 18, 19, 20 and 21 are letters of various dimensions and styles produced by means of the lettering appliance.

The operation of my appliance is as follows:

Base 13 is held firmly against the side of straightedge 15, by means of handle 14, with the left hand of the operator, and pin 17 is placed within the perforated letter element desired, by means of penholder 24, which is held in the right hand of the operator, in writing position.

By moving pin 17 along the edge of perforated letter element, the form of element is reproduced on paper by pen 16, when in contact with the surface of paper.

When changing from one element to another, for the purpose of producing the various letters, pen 16 is raised above the surface of the paper sufficiently to permit plate 11 or 12 to pass underneath pin 17, when, by means of handle 14, plate 11 or 12 is shifted along the side of straightedge 15 until the desired element is brought underneath pin 17, when the pen is lowered to the surface of paper, with element in properly spaced position, and the form of element is reproduced on paper by again moving pin 17 along the edge of perforation. Thus all letters are produced by means of shifting the lettering appliance so as to bring the various elements into proper position for writing the various letters and using the elementary forms for guiding the pen by means of pin 17.

Letters of various sizes may be made using various sizes of pins 17, also by means of cylindrical sleeves of various sizes being placed on pin 17, as shown in 23.

Having thus described my invention, what I claim as new and desire to secure by Letters Patent is as follows:

A device of the character described, comprising a plate having perforated forms representing the elements of alphabetical letters and numerals, a pen having a projecting member attached thereto for following the interior of perforated forms; said member being adapted to detachably receive sleeves of different outer dimensions for varying the size of letters reproduced.

In testimony whereof I have signed my name to this specification in the presence of two subscribing witnesses.

WILLIAM J. LILLY.

Witnesses:
HENRY H. LOGAN,
ROBT. C. LOGAN.